Figure 1:
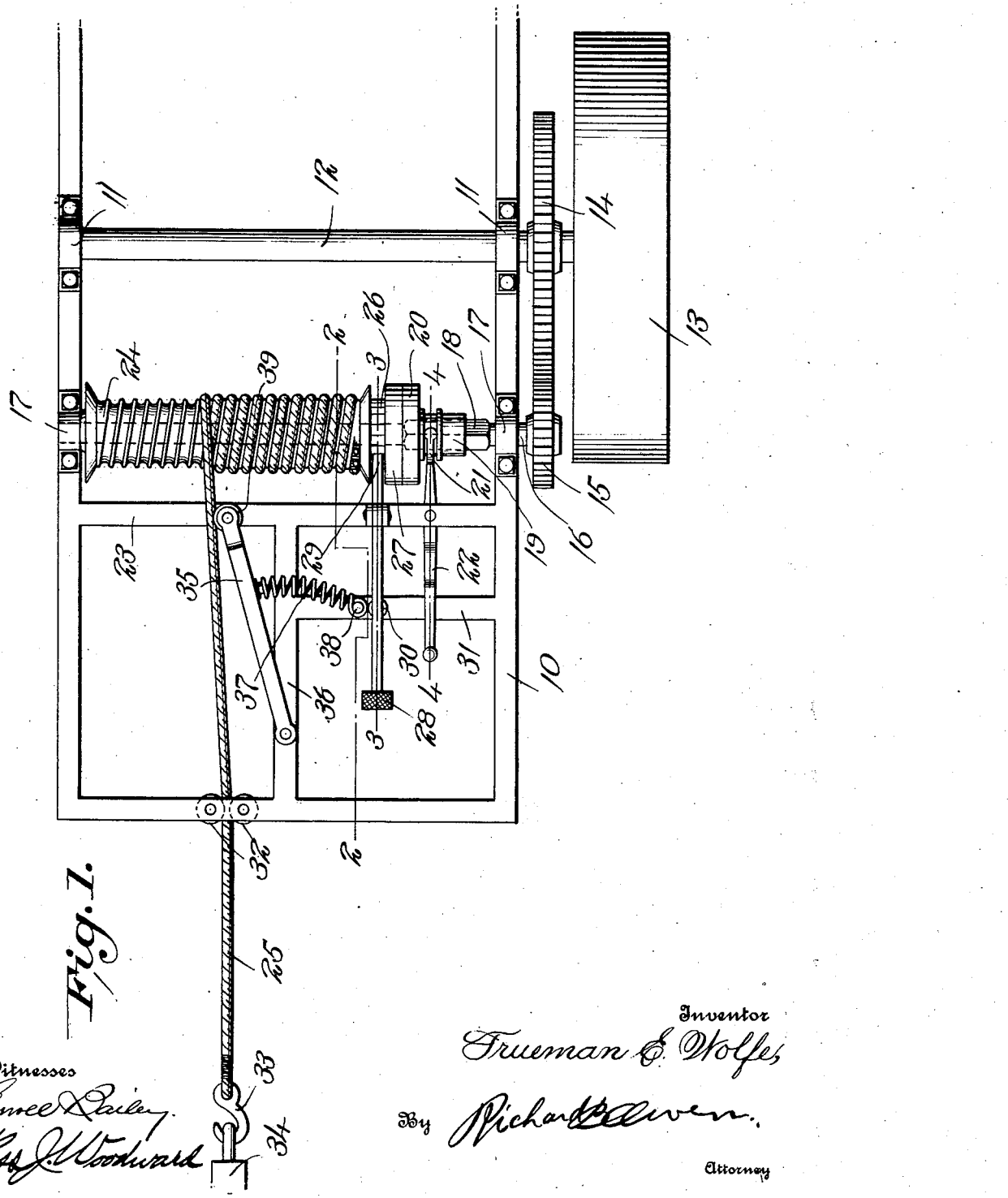

T. E. WOLFE.
CABLE GUIDE.
APPLICATION FILED JULY 17, 1914.

1,172,418.

Patented Feb. 22, 1916.
2 SHEETS—SHEET 1.

Witnesses

Inventor
Trueman E. Wolfe
By Richard B. Owen.
Attorney

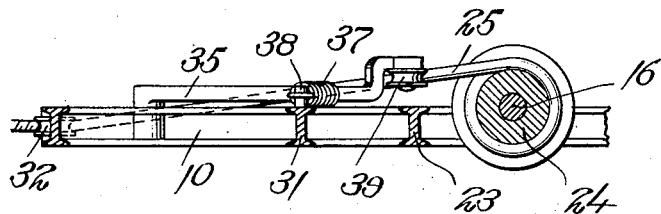
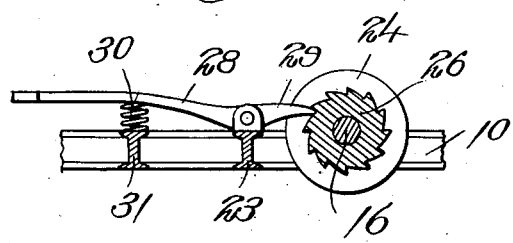
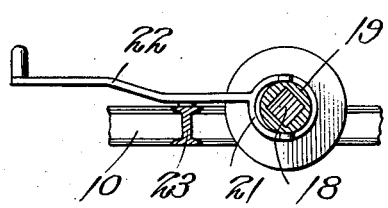
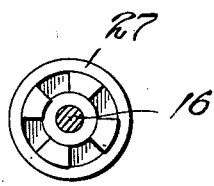
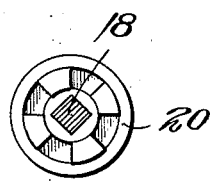

UNITED STATES PATENT OFFICE.

TRUEMAN E. WOLFE, OF MIAMI, NEW MEXICO.

CABLE-GUIDE.

1,172,418.

Specification of Letters Patent. Patented Feb. 22, 1916.

Application filed July 17, 1914. Serial No. 851,673.

*To all whom it may concern:*

Be it known that I, TRUEMAN E. WOLFE, a citizen of the United States, residing at Miami, in the county of Colfax and State of New Mexico, have invented certain new and useful Improvements in Cable-Guides, of which the following is a specification.

This invention relates to a cable guide which is used as part of a tractor and the principal object of the invention is to provide improved means for guiding the winding and unwinding of the cable upon its drum.

Another object of the invention is to provide improved means for causing the drum to rotate and also provide improved means for preventing the drum from rotating.

Another object of the invention is to provide a device which will be simple in construction and easy to operate.

This invention is illustrated in the accompanying drawings, wherein—

Figure 1 is a top plan view of a tractor provided with the improved construction; Fig. 2 is a longitudinal sectional view taken along the line 2—2 of Fig. 1; Fig. 3 is a sectional view taken along the line 3—3 of Fig. 1; Fig. 4 is a sectional view taken along the line 4—4 of Fig. 1; Fig. 5 is a view in elevation of the clutch carried by the drum; Fig. 6 is a view in elevation of the movable clutch which engages the clutch carried by the drum.

The frame 10 of this tractor is provided with bearings 11 in which the shaft 12 is rotatably mounted. This shaft 12 carries a pulley wheel 13 by means of which the shaft may be rotated through the medium of a suitable belt and also carries a large gear wheel 14 which meshes with a relatively small gear wheel 15 carried by the drum shaft 16.

The drum shaft 16 is rotatably mounted in bearings 17 carried by the frame 10 and is provided with an enlargement 18 which is rectangular in cross section as shown in Figs. 4 and 6 so that the sleeve 19 of the movable clutch 20 may rotate with the drum shaft. This sleeve 19 is engaged by the forks 21 of the shifting lever 22 which is pivotally connected with the cross bar 23 of the frame 10 so that by moving the lever 22, the movable clutch may be moved into and out of an operative position. The drum 24 is rotatably mounted upon the drum shaft 16 and is provided with threads as shown in Fig. 1, thus providing a spiral track in which the cable 25 is seated when wound upon the drum. At one end the drum is provided with a neck 26 which neck has teeth as shown in Fig. 3, thus forming a ratchet. At the outer end of the neck there is provided an enlarged head forming a clutch 27 which is engaged by the clutch 20, when the clutch 20 is in an operative position, as shown in Fig. 1. It will thus be seen that when the clutch 20 is in the operative position, the drum will be rotated with the drum shaft. In order to prevent the drum from unwinding when the clutch 20 is in an inoperative position, there is provided a treadle 28, the finger 29 of which engages the teeth of the ratchet 26 when the treadle is in the normal position. In order to yieldably hold the treadle in a normal position, there is provided a spring 30 which is positioned between the treadle 28 and the cross bar 31 of the frame.

The cable 25 which is wound upon the drum as shown in Fig. 1, passes over the cross bar 23 and between the rollers 32, carried by the frame 10. The free end of this cable is provided with a hook 33 so that the cable can be connected with the draft bar or tongue 34 of a plow or other piece of machinery which it is desired to haul. In order to guide the cable there is provided an arm 35 which is pivotally connected with the bar 36 and moved away from treadle 28 by the spring 37, one end of which is connected with the pin 38 extending from the cross bar 31 and the other end of which is connected with the guiding arm as shown in Fig. 1. A roller 39 is carried at the free end of the guiding arm so that free movement of the cable will not be interferred with.

When this tractor is in use, the cable is connected with the plow or other implement and the tractor is then moved forwardly. As the tractor moves forwardly, the shaft 12 will rotate and rotary motion will be transmitted to the drum shaft through the medium of the gear wheels 14 and 15. It has been stated that the shaft 12 is rotated by a suitable belt passing around the pulley wheel 13 but it is of course obvious that if desired, the pulley wheel 13 could be one of the supporting wheels of the tractor and the shaft 12, the axle of the wheel 13. If it is desired to wind the cable upon the drum in order to draw the plow, closer to the tractor, the lever 22 will be moved to the position shown in Fig. 1, thus causing the drum to rotate with the drum shaft. As the cable winds upon the drum shaft, the spring 37 will move the free end of the guiding arm 35 away from the bar 36 of frame 10, thus causing the cable to be wound evenly upon the drum seated in the spiral seat formed by the threads shown in Fig. 1. After the cable has been wound as much as desired, the lever 22 will be shifted to move the clutch 22 out of engagement with the clutch 27 and the drum will then not rotate with the drum shaft. Under normal circumstances, the treadle by engaging the ratchet 26 as shown in Fig. 3 will prevent the drum from unwinding when not engaged by the clutch 20 but if it is desired to permit the cable to unwind, the treadle can be pressed downwardly, thus moving the finger 29 of the treadle out of engagement with the ratchet 26. The drum will then be left to rotate and permit the cable to unwind. Of course, as the cable unwinds, the free end of the guiding arm 35 will be moved toward the bar 36. It will thus be seen that a very efficient and very simple device has been provided for winding a cable and that a very simple and efficient means has been provided for guiding the winding and unwinding of the cable. It will also be seen that a very simple and efficient means has been provided for operating the drum.

What is claimed is:—

1. A machine of the character described comprising a frame, a rotatable drum shaft, a drum rotatably mounted upon said shaft and provided with threads forming a spiral seat adapted to receive a cable, a guiding arm pivotally connected with said frame and having its free end extending toward said drum, a spring having one end connected with said frame and the opposite end connected with said arm to yieldingly hold the arm in engagement with the cable to exert a continuous pushing force upon one side of the cable and means for causing said drum to rotate with said drum shaft.

2. A machine of the character described comprising a frame, a rotatable drum shaft, a drum adapted to receive a cable rotatably mounted upon said shaft, a guiding arm movably connected with said frame and having its free end extending toward said drum, resilient means connected with said frame and with said arm to yieldingly hold the arm in engagement with the cable to exert a continuous pushing force upon one side of the cable, and means for causing said drum to rotate with said drum shaft.

In testimony whereof I affix my signature in presence of two witnesses.

TRUEMAN E. WOLFE.

Witnesses:
 CYRUS E. METZGER,
 AMANDA METZGER.